Patented Apr. 4, 1944

2,345,701

UNITED STATES PATENT OFFICE 2,345,701

PRODUCTION OF HALO-NITRO-ALKANES

Henry Dreyfus, London, England, assignor to Celanese Corporation of America, a corporation of Delaware No Drawing. Application January 25, 1941, Serial No. 375,957. In Great Britain January 19, 1940

11 Claims. (Cl. 260—644)

This invention relates to the production of halo-nitro-alkanes.

According to the invention nitro-alkyl halides, i. e. aliphatic compounds containing both nitro- and halogen substituents, are produced by subjecting alkyl halides having halogen atoms attached to more than one carbon atom to reaction with an alkali metal nitrite or an alkaline earth metal nitrite while maintaining in the reaction zone a quantity of the nitrite substantially less than the stoichiometric equivalent of the halogen present.

The invention provides an effective method of producing alipatic compounds valuable as intermediates in the manufacture of longer chain compounds. Thus an important embodiment of the invention is in the production of 1-chlor-2-nitro-ethane from ethylene chloride and the invention will be described more particularly in this connection; the 1-chlor-2-nitro-ethane can then be condensed e. g. with the aid of copper or other active metal as described in my copending application S. No. 375,956 filed January 25, 1941, to produce 1.4-dinitrobutane. Examples of other alkyl halides which may be employed as starting materials are 1.4 dichlorbutane, propylene chloride, 1.3 dichlorpropane and 1.6 dichlorhexane. The alkayl halides may contain other substituents besides halogen e. g. glycerine dichlorhydrin may be employed as starting material for the production of 1-nitro-2-oxy-3-chlorpropane.

As already indicated the quantity of nitrite present in the reaction zone is restricted to less than the stoichiometric equivalent of the halogen present and, in practice, it is preferred to have present not more, or not substantially more, than is equivalent to the halogen which it is desired to replace.

The use of a diluent is also of advantage in suppressing the formation of products of a higher degree of nitration than is desired. Preferably a diluent is employed which has solvent action both on the nitrite and on the alkyl halide employed as starting material since intimate contact between the reactants is thus facilitated with consequent benefit to the smoothness of the reaction and uniformity of the product. For instance, with ethylene chloride a most useful diluent is ethyl alcohol and this liquid is generally suitable, since if sodium nitrite is used and is employed in aqueous solution quite a large quantity of alcohol can be added without causing precipitation of the nitrite. Indeed, the reaction can be carried out in an alcoholic reaction medium although it is preferred to have present sufficient water to maintain the nitrite wholly in solution. In this connection it is to be noted that, whereas sodium nitrite is fairly soluble in aqueous ethyl alcohol of any concentration up to 90%, calcium nitrite is not soluble to any extent in dilute or in anhydrous ethyl alcohol, but is fairly soluble in ethyl alcohol of about 90% concentration. Aqueous ethyl alcohol of about 90% concentration is thus a diluent or reaction medium of wide applicability.

The quantity of diluent used may be varied within wide limits but in general it is desirable to employ such a quantity that the ethylene chloride or other alkyl chloride forms at the most only one-third of the total liquids in the reaction zone and preferably the degree of dilution of the halide is much higher than this, for instance the halide may form only one-fifth to one-tenth or even less e. g. one-twentieth of the total liquids present.

The reaction may be carried out by heating the reactants under a reflux condenser. When this method is employed complete conversion is signalised by a change, generally a rise, in the vapour temperature in the reflux condenser, the normal temperature being that of the boiling point of the lowest boiling constituent of the reaction mixture, or possibly of an azeotropic mixture formed by some or all of the liquid ingredients thereof. Thus ethylene chloride, ethyl alcohol and water form a ternary mixture boiling at 66.7° C. and, since 1-chlor-2-nitro-ethane boils at about 173° C., complete conversion of the ethylene chloride results in a rise in the vapour temperature of about 12° C., assuming ethylene chloride, ethyl alcohol and water are the only liquids present in the starting materials. Naturally, however, the process need not be carried out so as to effect complete conversion and, in view of the slowing down of the reaction which occurs as the concentration of ethylene chloride falls, it is most economical from the point of view of the heat used in the process to stop a batch process before complete conversion is reached.

A continuous method of operation can be employed if desired, for instance by passing the reaction mixture through a reaction zone of sufficient length in relation to the speed of passage to ensure reaction to the desired degree; the reaction vessel may be in the form of a length of tubing constructed, for instance, from corrosion resisting steel.

Whether a batch or continuous process is employed it is desirable that the reactants and diluents should be thoroughly mixed before being raised to the reaction temperature and, especially in a batch process, stirring equipment may be provided to maintain thorough admixture.

In order to hasten the reaction, temperatures higher than the boiling point of the lowest boiling ingredient (or any azeotropic mixture) may be used by conducting the process under superatmospheric pressure. The desired pressure which may be of the order of 5–10 atmospheres or even more, e. g. 20 atmospheres, may be developed with the aid of an inert gas, for instance, nitrogen.

Having described my invention, what I desire to secure by Letters Patent is:

1. Process for the production of halo-nitroalkanes which comprises subjecting alkyl halides having atoms of the same halogen attached to more than one carbon atom to reaction with a nitrite of a metal selected from the group consisting of the alkali metals and the alkaline earth metals while maintaining in the reaction zone a quantity of the nitrite substantially less than the stoichiometric equivalent of the halogen present.

2. Process for the production of 1-chlor-2-nitro-ethane which comprises subjecting ethylene chloride to reaction with a nitrite of a metal selected from the group consisting of the alkali metals and the alkaline earth metals while maintaining in the reaction zone a quantity of the nitrite substantially less than the stoichiometric equivalent of the halogen present.

3. Process for the production of halo-nitroalkanes which comprises subjecting alkyl halides having atoms of the same halogen attached to more than one carbon atom to reaction with a nitrite of a metal selected from the group consisting of the alkali metals and the alkaline earth metals while maintaining in the reaction zone a quantity of the nitrite substantially less than the stoichiometric equivalent of the halogen present, the reaction being carried out in the presence of a diluent.

4. Process for the production of 1-chlor-2-nitro-ethane which comprises subjecting ethylene chloride to reaction with a nitrite of a metal selected from the group consisting of the alkali metals and the alkaline earth metals while maintaining in the reaction zone a quantity of the nitrite substantially less than the stoichiometric equivalent of the halogen present, the reaction being carried out in the presence of a diluent.

5. Process for the production of halo-nitroalkanes which comprises subjecting alkyl halides having atoms of the same halogen attached to more than one carbon atom to reaction with a nitrite of a metal selected from the group consisting of the alkali metals and the alkaline earth metals while maintaining in the reaction zone a quantity of the nitrite which is not substantially more than is equivalent to the halogen which it is desired to replace, the reaction being carried out in the presence of a diluent consisting of ethyl alcohol of about 90% concentration.

6. Process for the production of 1-chlor-2-nitro-ethane which comprises subjecting ethylene chloride to reaction with a nitrite of a metal selected from the group consisting of the alkali metals and the alkaline earth metals while maintaining in the reaction zone a quantity of the nitrite which is not substantially more than is equivalent to the halogen which it is desired to replace, the reaction being carried out in the presence of a diluent consisting of ethyl alcohol of about 90% concentration.

7. Process for the production of halo-nitroalkanes which comprises subjecting alkyl halides having atoms of the same halogen attached to more than one carbon atom to reaction with a nitrite of a metal selected from the group consisting of the alkali metals and the alkaline earth metals while maintaining in the reaction zone a quantity of the nitrite which is not substantially more than is equivalent to the halogen which it is desired to replace, the reaction being carried out in the presence of a diluent and the halogen compound employed as starting material forming from $\frac{1}{5}$th to $\frac{1}{10}$th of the total volume of liquids present.

8. Process for the production of 1-chlor-2-nitro-ethane which comprises subjecting ethylene chloride to reaction with a nitrite of a metal selected from the group consisting of the alkali metals and the alkaline earth metals while maintaining in the reaction zone a quantity of the nitrite which is not substantially more than is equivalent to the halogen which it is desired to replace, the reaction being carried out in the presence of a diluent and the halogen compound employed as starting material forming from $\frac{1}{5}$th to $\frac{1}{10}$th of the total volume of liquids present.

9. Process for the production of halo-nitroalkanes which comprises subjecting alkyl halides having atoms of the same halogen attached to more than one carbon atom to reaction with a nitrite of a metal selected from the group consisting of the alkali metals and the alkaline earth metals while maintaining in the reaction zone a quantity of the nitrite which is not substantially more than is equivalent to the halogen which it is desired to replace, the reaction being carried out in the presence of a diluent consisting of ethyl alcohol of about 90% concentration and the halogen compound employed as starting material forming from $\frac{1}{5}$th to $\frac{1}{10}$th of the total volume of liquids present.

10. Process for the production of 1-chlor-2-nitro-ethane which comprises subjecting ethylene chloride to reaction with a nitrite of a metal selected from the group consisting of the alkali metals and the alkaline earth metals while maintaining in the reaction zone a quantity of the nitrite which is not substantially more than is equivalent to the halogen which it is desired to replace, the reaction being carried out in the presence of a diluent consisting of ethyl alcohol of about 90% concentration, and the halogen compound employed as starting material forming from $\frac{1}{5}$th to $\frac{1}{10}$th of the total volume of liquids present.

11. Process according to claim 10 wherein the reaction is carried out under superatmospheric pressure at a temperature higher than the normal boiling point of the lowest boiling ingredient of the reaction mixture.

HENRY DREYFUS.

CERTIFICATE OF CORRECTION.

Patent No. 2,345,701. April 4, 1944.

HENRY DREYFUS.

It is hereby certified that error appears in the printed specification of the above numbered patent requiring correction as follows: Page 1, first column, line 3, for "nitro-alkyl halides" read --halo-nitro-alkanes--; line 28, for "alkayl" read --alkyl--; and that the said Letters Patent should be read with this correction therein that the same may conform to the record of the case in the Patent Office.

Signed and sealed this 6th day of June, A. D. 1944.

Leslie Frazer (Seal) Acting Commissioner of Patents.

CERTIFICATE OF CORRECTION.

Patent No. 2,345,701. April 4, 1944.

HENRY DREYFUS.

It is hereby certified that error appears in the printed specification of the above numbered patent requiring correction as follows: Page 1, first column, line 3, for "nitro-alkyl halides" read --halo-nitro-alkanes--; line 28, for "alkayl" read --alkyl--; and that the said Letters Patent should be read with this correction therein that the same may conform to the record of the case in the Patent Office.

Signed and sealed this 6th day of June, A. D. 1944.

Leslie Frazer (Seal) Acting Commissioner of Patents.